US012803865B2

(12) United States Patent
Ray et al.

(10) Patent No.: US 12,803,865 B2
(45) Date of Patent: Nov. 17, 2026

(54) NETWORK DATA SERVER COMMON CAUSE FAILURE MITIGATION SYSTEM

(71) Applicant: JPMorgan Chase Bank, N.A., New York, NY (US)

(72) Inventors: Rajat Ray, Singapore (SG); Navin Varma, Hyderabad (IN); Victoria Zanatian, Columbus, OH (US); Pamela Hui Sin, Singapore (SG); Nikita Vasireddy, Hyderabad (IN); Megha Singh, Ghaziabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 267 days.

(21) Appl. No.: 18/802,286

(22) Filed: Aug. 13, 2024

(65) Prior Publication Data

US 2026/0005915 A1 Jan. 1, 2026

(30) Foreign Application Priority Data

Jun. 27, 2024 (IN) ............................. 202411049431

(51) Int. Cl.

| | |
|---|---|
| ***H04L 41/0654*** | (2022.01) |
| ***G06F 3/0482*** | (2013.01) |
| ***H04L 41/0631*** | (2022.01) |
| ***H04L 41/0816*** | (2022.01) |

(52) U.S. Cl.

CPC ........ *H04L 41/0654* (2013.01); *G06F 3/0482* (2013.01); *H04L 41/0631* (2013.01); *H04L 41/0816* (2013.01)

(58) Field of Classification Search

CPC ............. H04L 41/0654; H04L 41/0631; H04L 41/0816; H04L 41/22; G06F 3/0482

See application file for complete search history.

(56) References Cited

U.S. PATENT DOCUMENTS

| | | | | |
|---|---|---|---|---|
| 11,113,144 | B1 * | 9/2021 | Gadepalli | G06N 3/0895 |
| 2018/0276063 | A1 * | 9/2018 | Mendes | G06F 11/3409 |
| 2019/0165988 | A1 * | 5/2019 | Wang | H04L 41/0631 |
| 2023/0328063 | A1 * | 10/2023 | Li | H04L 63/0876 726/1 |
| 2025/0039104 | A1 * | 1/2025 | Matthews | H04L 47/32 |
| 2025/0062953 | A1 * | 2/2025 | Chen | H04L 41/08 |
| 2025/0199894 | A1 * | 6/2025 | Ray | G06F 11/3452 |
| 2025/0310226 | A1 * | 10/2025 | Silverstein | G06F 16/282 |

* cited by examiner

*Primary Examiner* — Abdullahi Ahmed

(74) *Attorney, Agent, or Firm* — Greenblum & Bernstein, P.L.C.

(57) ABSTRACT

A method for implementing a data server network infrastructure maintenance tool within a data server network. The method comprises obtaining an initial data server network configuration, extracting a set of correlations from at least one repository of historical network failure incident information, detecting a first set of failures via at least one telemetry system of the data server network, determining a current state of the data server network via the at least one telemetry system, generating an updated network configuration based on the first set of failures and the current state of the data server network, identifying a second set of components that is likely to fail, and at least one from among preventing and repairing at least one subsequent failure.

20 Claims, 4 Drawing Sheets

400

NETWORK DATA SERVER COMMON CAUSE FAILURE MITIGATION SYSTEM

CROSS-REFERENCE TO RELATED APPLICATIONS

This application claims priority benefit from Indian Application No. 202411049431, filed Jun. 27, 2024, which is hereby incorporated by reference in its entirety.

BACKGROUND

1. Field of the Invention

The field of the invention disclosed herein generally relates to common cause failure mitigation and, more particularly, to a method, system, and computer-readable medium for implementing technology that provides a common cause failure mitigation tool that programmatically improves a network data server infrastructure's resilience to common cause failures by dynamically rectifying at least one of the network data server infrastructure's common cause failure issues with a customized solution.

2. Background of the Invention

Over the life of a server network, server network performance issues may require a workforce of server network specialists to investigate and resolve the server network performance issues. Unfortunately, while these specialists respond to such issues, more severe server network performance issues may arise as a result of the former server network performance issues. Hence, existing approaches to resolving server network performance issues can exacerbate server network performance over time.

However, there is currently no technology available for programmatically addressing such server network performance issues or for detecting them before they actually occur.

Therefore, there is a need in the field of the present invention for a technical solution to the foregoing absence of technology in the maintenance and protection of a server network and its infrastructure.

SUMMARY

The present disclosure, through one or more of its various aspects, embodiments, and/or specific features or sub-components, provides, inter alia, various systems, servers, devices, methods, media, programs and platforms for implementing a common cause failure detection system that programmatically improves a network data server infrastructure's resilience to common cause failures by dynamically rectifying at least one of the network data server infrastructure's common cause failure issues with a customized solution.

According to an aspect of the present disclosure, a method is provided for implementing a data server network infrastructure maintenance tool within a data server network. The method may comprise: obtaining an initial data server network configuration that includes an initial network infrastructure topology and an initial network component manifest which identifies each component of an infrastructure of the data server network; extracting, from at least one repository of historical network failure incident information, a set of correlations that includes at least one correlation between more than one network component failure which respectively correspond to more than one component of the infrastructure; detecting, via at least one telemetry system, a first set of failures that respectively correspond to a first set of components of the infrastructure; determining, via the at least one telemetry system, a current state of the data server network; generating an updated network configuration by updating the initial data server network configuration based on the first set of failures and the current state of the data server network; identifying, by evaluating the set of correlations against the updated network configuration, at least one from among a first set of root causes of the first set of failures and a second set of components that is likely to fail as a result of at least one from among the first set of failures and the first set of root causes of the first set of failures; and mitigating the result by at least one from among preventing and repairing at least one subsequent failure of at least one respectively corresponding second component from among the second set of components.

The method may further comprise monitoring, via the at least one telemetry system, the data server network by evaluating a new state of the data server network to determine whether the evaluating of the new state identifies a third set of failures.

The method may further comprise: identifying, based on the monitoring of the data server network, the third set of failures; determining, via the at least one telemetry system, an updated state of the data server network; extracting, from the updated state of the data server network, at least one new correlation that exists between the third set of failures and at least a fourth failure that respectively corresponds to at least a second component of the data server network; and replacing the set of correlations with an updated set of correlations by incorporating the at least one new correlation into the set of correlations.

In the method, the preventing of the at least one subsequent failure may comprise at least one from among programmatically repairing the first set of root causes and programmatically decoupling the at least one respectively corresponding second component from the first set of root causes, the repairing of the at least one subsequent failure may comprise programmatically replacing the at least one respectively corresponding second component with at least one respectively corresponding new component by deploying the at least one respectively corresponding new component to replace the at least one respectively corresponding second component.

The method may further comprise: calculating, based on the updated network configuration, a set of likelihoods of failure that respectively correspond to the second set of components; and displaying, via a graphical user interface (GUI), the set of likelihoods of failure and a set of respectively corresponding mappings that associates each likelihood from among the set of likelihoods with a respectively corresponding component from among the second set of components. The GUI may comprise a depiction of at least one from among an up-to-date network infrastructure topology and an up-to-date network component manifest.

The method may further comprise utilizing a set of artificial intelligence and machine learning (AI/ML) models to calculate the set of likelihoods of failure. Each AI/ML model from among the set of AI/ML models may have been trained in accordance with a distinct methodology that is based on the set of correlations.

In the method, the set of likelihoods of failure may comprise respectively corresponding weighted aggregates of at least a first subset of likelihoods of failure that is calculated by a first AI/ML model from among the set of AI/ML models, and a second subset of likelihoods of failure that is calculated by a second AI/ML model from among the set of AI/ML models.

In the method, the GUI may include a plurality of views that comprise: a first view that depicts the first subset of likelihoods of failure; a second view that depicts the second subset of likelihoods of failure; and a third view that depicts the set of likelihoods of failure. The GUI may further include a drop-down menu and displays at least one selected view from among the plurality of views based on at least one selection from the drop-down menu, which includes a respectively corresponding plurality of selections.

In the method, the initial network component manifest may identify at least one processor component, at least one hard disk component, at least one random access memory (RAM) component, at least one switch component, and at least one fan component.

The method may further comprise providing, by analyzing an anticipated failure, a likelihood of the anticipated failure and providing a graphical user interface (GUI) that displays at least one from among: historical failure predictions; historical failure remediations; current statuses of respectively corresponding failures; and a mapping view that includes a mapping for each from among a set of potential remediations and identifies respectively corresponding remediation conditions. In the method, the respectively corresponding remediation conditions may comprise at least one from among component-specific remediation information and impact-related failure information.

According to another aspect of the present disclosure, a system is provided for implementing a data server network infrastructure maintenance tool within a data server network. The system may comprise a processor and memory that stores instructions that cause the processor to perform operations when the instructions are executed by the processor. The operations may comprise: obtaining an initial data server network configuration that includes an initial network infrastructure topology and an initial network component manifest which identifies each component of an infrastructure of the data server network; extracting, from at least one repository of historical network failure incident information, a set of correlations that includes at least one correlation between more than one network component failure which respectively correspond to more than one component of the infrastructure; detecting, via at least one telemetry system, a first set of failures that respectively correspond to a first set of components of the infrastructure; determining, via the at least one telemetry system, a current state of the data server network; generating an updated network configuration by updating the initial data server network configuration based on the first set of failures and the current state of the data server network; identifying, by evaluating the set of correlations against the updated network configuration, at least one from among a first set of root causes of the first set of failures and a second set of components that is likely to fail as a result of at least one from among the first set of failures and the first set of root causes of the first set of failures; and mitigating the result by at least one from among preventing and repairing at least one subsequent failure of at least one respectively corresponding second component from among the second set of components.

In the system, when executed, the instructions may cause the processor to perform operations that comprise monitoring, via the at least one telemetry system, the data server network by evaluating a new state of the data server network to determine whether the evaluating of the new state identifies a third set of failures.

In the system, when executed, the instructions may cause the processor to perform operations that comprise: identifying, based on the monitoring of the data server network, the third set of failures; determining, via the at least one telemetry system, an updated state of the data server network; extracting, from the updated state of the data server network, at least one new correlation that exists between the third set of failures and at least a fourth failure that respectively corresponds to at least a second component of the data server network; and replacing the set of correlations with an updated set of correlations by incorporating the at least one new correlation into the set of correlations.

In the system, when the instructions are executed, the preventing of the at least one subsequent failure may comprise at least one from among programmatically repairing the first set of root causes and programmatically decoupling the at least one respectively corresponding second component from the first set of root causes, the repairing of the at least one subsequent failure may comprise programmatically replacing the at least one respectively corresponding second component with at least one respectively corresponding new component by deploying the at least one respectively corresponding new component to replace the at least one respectively corresponding second component.

In the system, when executed, the instructions may cause the processor to perform operations that comprise: calculating, based on the updated network configuration, a set of likelihoods of failure that respectively correspond to the second set of components; and displaying, via a GUI, the set of likelihoods of failure and a set of respectively corresponding mappings that associates each likelihood from among the set of likelihoods with a respectively corresponding component from among the second set of components. The GUI may comprise a depiction of at least one from among an up-to-date network infrastructure topology and an up-to-date network component manifest.

In the system, when executed, the instructions may cause the processor to perform operations that comprise utilizing a set of AI/ML models to calculate the set of likelihoods of failure. Each AI/ML model from among the set of AI/ML models may have been trained in accordance with a distinct methodology that is based on the set of correlations.

In the system, when the instructions are executed, the set of likelihoods of failure may comprise respectively corresponding weighted aggregates of at least a first subset of likelihoods of failure that is calculated by a first AI/ML model from among the set of AI/ML models, and a second subset of likelihoods of failure that is calculated by a second AI/ML model from among the set of AI/ML models.

In the system, when the instructions are executed, the GUI includes a plurality of views that may comprise a first view that depicts the first subset of likelihoods of failure, a second view that depicts the second subset of likelihoods of failure, and a third view that depicts the set of likelihoods of failure. The GUI may further include a drop-down menu and displays at least one selected view from among the plurality of views based on at least one selection from the drop-down menu, which includes a respectively corresponding plurality of selections.

In the system, when the instructions are executed, the initial network component manifest may identify at least one processor component, at least one hard disk component, at least one RAM component, at least one switch component, and at least one fan component.

In the system, when executed, the instructions may cause the processor to perform further operations comprising providing, by analyzing an anticipated failure, a likelihood of the anticipated failure and providing a graphical user interface (GUI) that displays at least one from among: historical failure predictions; historical failure remediations; current statuses of respectively corresponding failures; and a mapping view that includes a mapping for each from among a set of potential remediations and identifies respectively corresponding remediation conditions. In the method, the respectively corresponding remediation conditions may comprise at least one from among component-specific remediation information and impact-related failure information.

According to yet another aspect of the present invention, a non-transitory computer-readable medium is provided for implementing a data server network infrastructure maintenance tool within a data server network. The computer-readable medium may store instructions that cause a processor to perform operations when the instructions are executed by a processor. The operations may comprise: obtaining an initial data server network configuration that includes an initial network infrastructure topology and an initial network component manifest which identifies each component of an infrastructure of the data server network; extracting, from at least one repository of historical network failure incident information, a set of correlations that includes at least one correlation between more than one network component failure which respectively correspond to more than one component of the infrastructure; detecting, via at least one telemetry system, a first set of failures that respectively correspond to a first set of components of the infrastructure; determining, via the at least one telemetry system, a current state of the data server network; generating an updated network configuration by updating the initial data server network configuration based on the first set of failures and the current state of the data server network; identifying, by evaluating the set of correlations against the updated network configuration, at least one from among a first set of root causes of the first set of failures and a second set of components that is likely to fail as a result of at least one from among the first set of failures and the first set of root causes of the first set of failures; and mitigating the result by at least one from among preventing and repairing at least one subsequent failure of at least one respectively corresponding second component from among the second set of components.

In the computer-readable medium, when executed the instructions may cause the processor to perform operations that comprise monitoring, via the at least one telemetry system, the data server network by evaluating a new state of the data server network to determine whether the evaluating of the new state identifies a third set of failures.

In the computer-readable medium, when executed, the instructions may cause the processor to perform operations that comprise: identifying, based on the monitoring of the data server network, the third set of failures; determining, via the at least one telemetry system, an updated state of the data server network; extracting, from the updated state of the data server network, at least one new correlation that exists between the third set of failures and at least a fourth failure that respectively corresponds to at least a second component of the data server network; and replacing the set of correlations with an updated set of correlations by incorporating the at least one new correlation into the set of correlations.

In the computer-readable medium, when the instructions are executed, the preventing of the at least one subsequent failure may comprise at least one from among programmatically repairing the first set of root causes and programmatically decoupling the at least one respectively corresponding second component from the first set of root causes, the repairing of the at least one subsequent failure may comprise programmatically replacing the at least one respectively corresponding second component with at least one respectively corresponding new component by deploying the at least one respectively corresponding new component to replace the at least one respectively corresponding second component.

In the computer-readable medium, when executed, the instructions may cause the processor to perform operations that comprise: calculating, based on the updated network configuration, a set of likelihoods of failure that respectively correspond to the second set of components; and displaying, via a GUI, the set of likelihoods of failure and a set of respectively corresponding mappings that associates each likelihood from among the set of likelihoods with a respectively corresponding component from among the second set of components. The GUI may comprise a depiction of at least one from among an up-to-date network infrastructure topology and an up-to-date network component manifest.

In the computer-readable medium, when executed, the instructions may cause the processor to perform further operations that comprise utilizing a set of AI/ML models to calculate the set of likelihoods of failure. Each AI/ML model from among the set of AI/ML models may have been trained in accordance with a distinct methodology that is based on the set of correlations.

In the computer-readable medium, when the instructions are executed, the set of likelihoods of failure may comprise respectively corresponding weighted aggregates of at least a first subset of likelihoods of failure that is calculated by a first AI/ML model from among the set of AI/ML models, and a second subset of likelihoods of failure that is calculated by a second AI/ML model from among the set of AI/ML models.

In the computer-readable medium, when the instructions are executed, the GUI may include a plurality of views that comprise a first view that depicts the first subset of likelihoods of failure, a second view that depicts the second subset of likelihoods of failure and a third view that depicts the set of likelihoods of failure. The GUI may further include a drop-down menu and displays at least one selected view from among the plurality of views based on at least one selection from the drop-down menu, which includes a respectively corresponding plurality of selections.

In the computer-readable medium, when the instructions are executed, the initial network component manifest may identify at least one processor component, at least one hard disk component, at least one RAM component, at least one switch component, and at least one fan component.

In the computer-readable medium, when executed, the instructions may cause the processor to perform further operations comprising providing, by analyzing an anticipated failure, a likelihood of the anticipated failure and providing a graphical user interface (GUI) that displays at least one from among: historical failure predictions; historical failure remediations; current statuses of respectively corresponding failures; and a mapping view that includes a mapping for each from among a set of potential remediations and identifies respectively corresponding remediation conditions. In the method, the respectively corresponding remediation conditions may comprise at least one from among component-specific remediation information and impact-related failure information.

Accordingly, the invention disclosed herein provides a new approach to a network data server infrastructure's maintenance that programmatically improves the network data server infrastructure's resilience to common cause failures.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
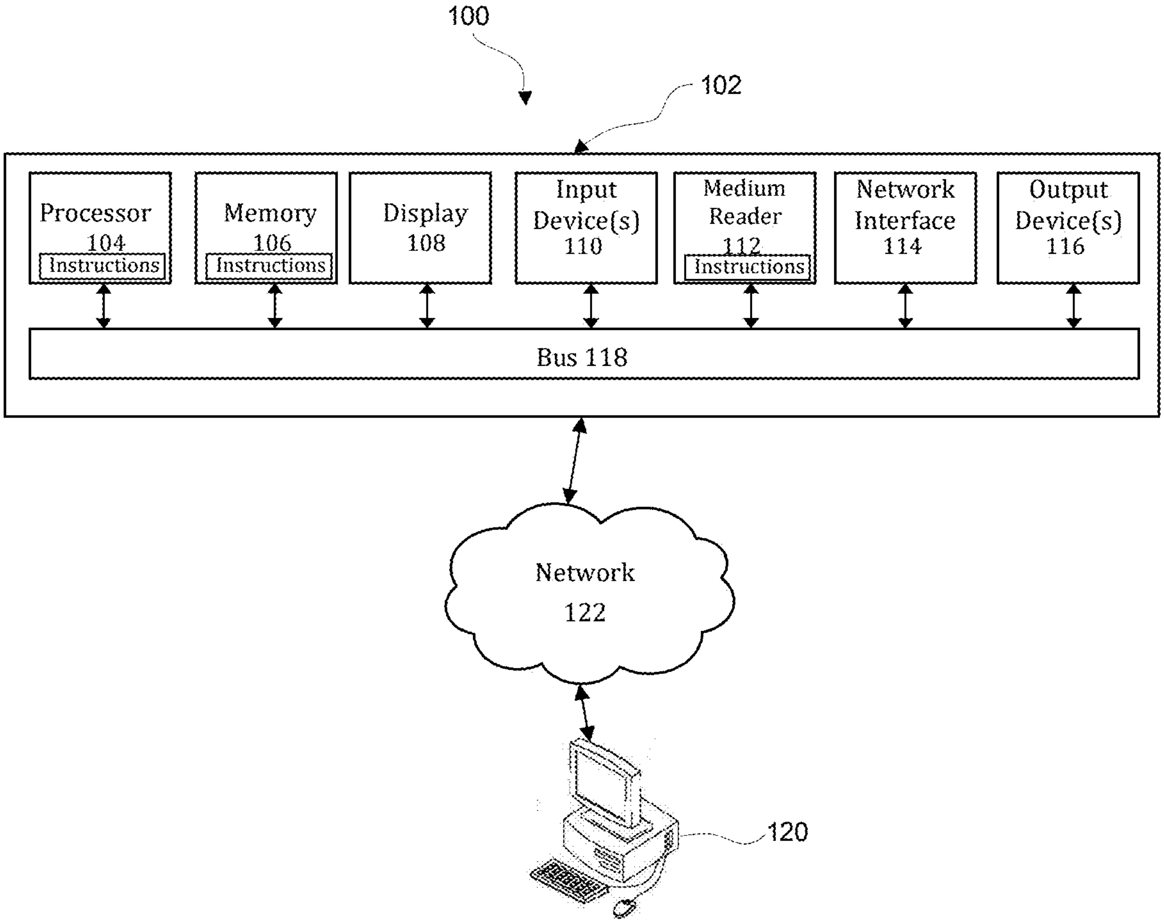
FIG. 1 depicts a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for longer than a transitory period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing a common cause failure detection system that improves a network data server infrastructure's resilience to common cause failures by dynamically rectifying at least one of the network data server infrastructure's common cause failure issues with a customized solution.

Figure 2:
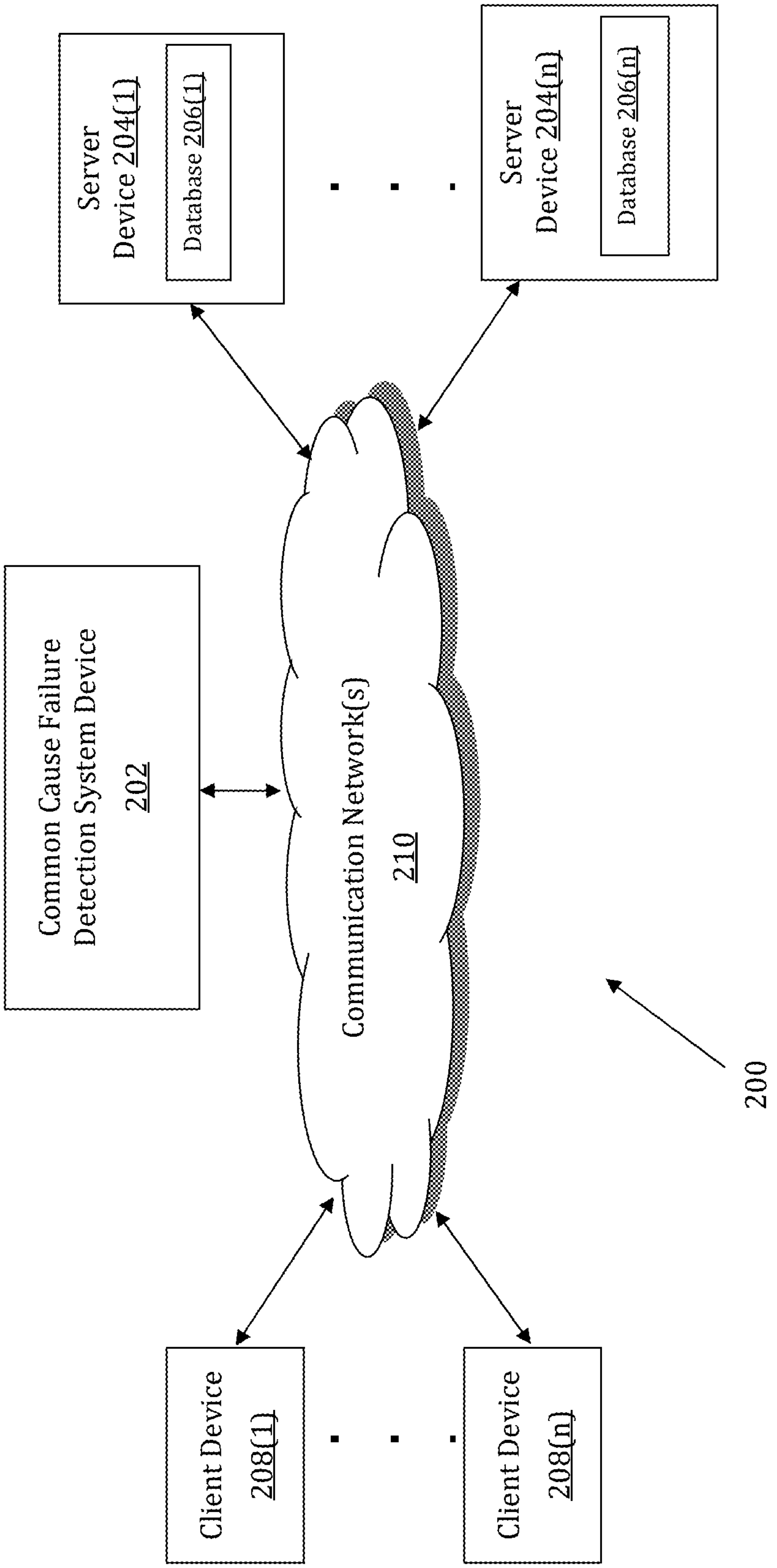
FIG. 2 depicts a diagram of an exemplary network environment for improving a network data server infrastructure's resilience to common cause failures.

Referring to FIG. 2, a schematic of an exemplary network environment 200 for rectifying at least one of a network data server infrastructure's common cause failure issues. In an exemplary embodiment, a common cause failure detection system may be implemented on any networked computer platform, such as, for example, a personal computer (PC).

A method for implementing a tool that provides an optimized transmission log storage and retrieval scheme, may be implemented by a common cause failure detection system (CCFDS) device 202. The CCFDS device 202 may be the same or similar to the computer system 102 as described with respect to FIG. 1. The CCFDS device 202 may be a rack-mounted server in a datacenter, an embedded microcontroller (MCU) in an electronic device, or another type of headless system, which is a computer system or device that is configured to operate without a monitor, keyboard and mouse. The CCFDS device 202 may store one or more applications that can include executable instructions that, when executed by the CCFDS device 202, cause the CCFDS device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CCFDS device 202 itself, may be located in virtual server(s) running in a cloud-based computing environment rather than being tied to one or more specific physical network computing devices. Also, the application(s) may be running in one or more virtual machines (VMs) executing on the CCFDS device 202. Additionally, in one or more embodiments of this technology, virtual machine(s) running on the CCFDS device 202 may be managed or supervised by a hypervisor.

In the network environment 200 of FIG. 2, the CCFDS device 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the CCFDS device 202, such as the network interface 114 of the computer system 102 of FIG. 1, operatively couples and communicates between the CCFDS device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CCFDS device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, computer readable media, and CCFDS devices that implement a method for a common cause failure detection system that rectifies at least one of the network data server infrastructure's common cause failure issues.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CCFDS device 202 may be a standalone device or integrated with one or more other devices or apparatuses, such as one or more of the server devices 204(1)-204(*n*), for example. In one particular example, the CCFDS device 202 may include or be hosted by one of the server devices 204(1)-204(*n*), and other arrangements are also possible. As another example, the CCFDS device 202 may be integrated with one or more other devices or apparatuses, such as one or more of the client devices 208(1)-208(*n*). Moreover, one or more of the devices of the CCFDS device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, memories and communication interfaces, which are coupled together by at least one bus or other communication link, although other numbers and/or types of network devices may be used. The server devices 204(1)-204(*n*) in this example may process requests received from the CCFDS device 202 via the communication network(s) 210 according to an HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store data that relates to a variety of databases.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the CCFDS device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the CCFDS device 202 via the communication network(s) 210 in order to communicate user requests and other information. The client devices 208(1)-208(*n*) may further include, among other features, a display device, such as a display screen or touchscreen, and/or an input device, such as a keyboard, for example.

Although the exemplary network environment 200 with the CCFDS device 202, the server devices 204(1)-204(*n*), the databases 206(1)-206(*n*), the client devices 208(1)-208 (*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CCFDS device 202, the server devices 204(1)-204(*n*), the databases 206(1)-206(*n*), or the client devices 208(1)-208(*n*), for example, may be configured to operate as virtual instances on the same physical machine. In other words, one or more of the CCFDS device 202, the server devices 204(1)-204(*n*), the databases 206(1)-206(*n*), or the client devices 208(1)-208(*n*) may operate on the same physical device rather than as separate devices communicating through communication network(s) 210. Additionally, there may be more or fewer server devices 204(1)-204(*n*), databases 206(1)-206(*n*), or client devices 208(1)-208(*n*) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
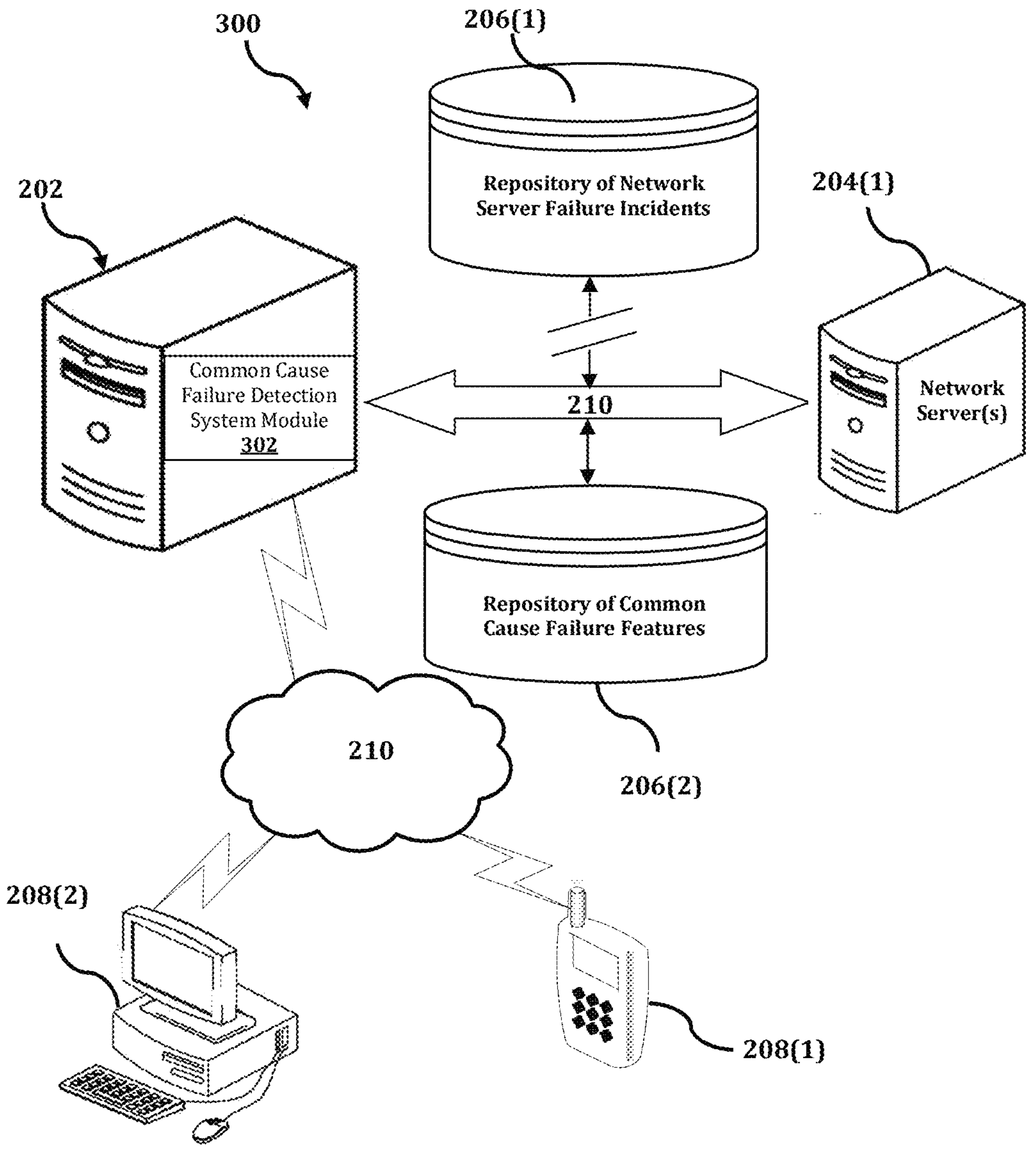
FIG. 3 depicts a diagram of an exemplary perspective of a network environment that improves a network data server infrastructure's resilience to common cause failures.

The CCFDS device 202 is described and illustrated in FIG. 3 as including common cause failure detection system module 302, although it may include other rules, policies, modules, databases, or applications, for example. As will be described below, common cause failure detection system module 302 is configured to rectify at least one network data server infrastructure common cause failure issue. Common cause failure detection system module 302 may include software that is based on a microservices architecture.

Common cause failure detection system module 302 may be integrated with one or more devices or apparatuses, such as client devices 208(1)-208(*n*), where common cause failure detection system module 302 may be implemented as an application or as an addon or plugin to another application of the one or more devices or apparatuses, and where common cause failure detection system module 302 may execute in the background.

An exemplary process 300 for application of a common cause failure detection system to an aspect of the network environment of FIG. 2 is illustrated as being executed in FIG. 3. Specifically, a first client device 208(1) and a second client device 208(2) are illustrated as being in communication with CCFDS device 202. In this regard, the first client device 208(1) and the second client device 208(2) may be "clients" of the CCFDS device 202 and are described herein as such. Nevertheless, it is to be known and understood that the first client device 208(1) and/or the second client device 208(2) need not necessarily be "clients" of the CCFDS device 202, or any entity described in association therewith herein. Any additional or alternative relationship may exist between either or both of first client device 208(1), second client device 208(2) and CCFDS device 202, or no relationship may exist.

Further, CCFDS device 202 is illustrated as being able to access at least one Repository of Network Server Failure Incidents 206(1), and at least one Repository of Common Cause Failure Features 206(2). CCFDS device 202 may comprise common cause failure detection system module 302, which communicates with Repository of Network Server Failure Incidents 206(1). In addition, common cause failure detection system module 302 of CCFDS device 202 may also communicate with Repository of Common Cause Failure Features 206(2). Common cause failure detection system module 302 may be configured to provide a dynamically customizable interface for calculating and depicting a set of likelihoods of failure for at least one component of a network data infrastructure.

Moreover, CCFDS device 202 may receive and transmit data via communication network(s) 210. CCFDS device 202 may receive and transmit data such as code that is written in one or more of the following dialects: transaction control language (TCL), data manipulation language (DML), data control language (DCL) and data definition language (DFL). Additionally, via communication network(s) 210, CCFDS device 202 may respectively receive and transmit data from and to one or more from among the following devices: server device 204, Repository of Network Server Failure Incidents 206(1), Repository of Common Cause Failure Features 206(2) (or another database 206), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(*n*) may represent, for example, computer systems of an organization's client network. The first client device 208(1) may represent, for example, one or more computer systems of a client or of a cluster of clients within the organization or client network. Of course, the first client device 208(1) may include one or more of any of the devices described herein. The second client device 208(2) may be, for example, one or more computer systems of another client or cluster of clients within the organization or client network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the CCFDS device 202 via broadband or cellular communication. Of course, these embodiments are merely exemplary and are not limiting or exhaustive.

Common cause failure detection system module 302 programmatically rectifies at least one of the network data server infrastructure's common cause failure issues by dynamically rectifying at least one of the network data server infrastructure's common cause failure issues with a customized solution.

Common cause failure detection system module 302 may execute a process that programmatically improve a network data server infrastructure's resilience to common cause failure issues by dynamically rectifying at least one of the network data server infrastructure's common cause failure issues with a customized solution. An exemplary process for a common cause failure detection system is generally indicated at flowchart 400 in FIG. 4.

Figure 4:
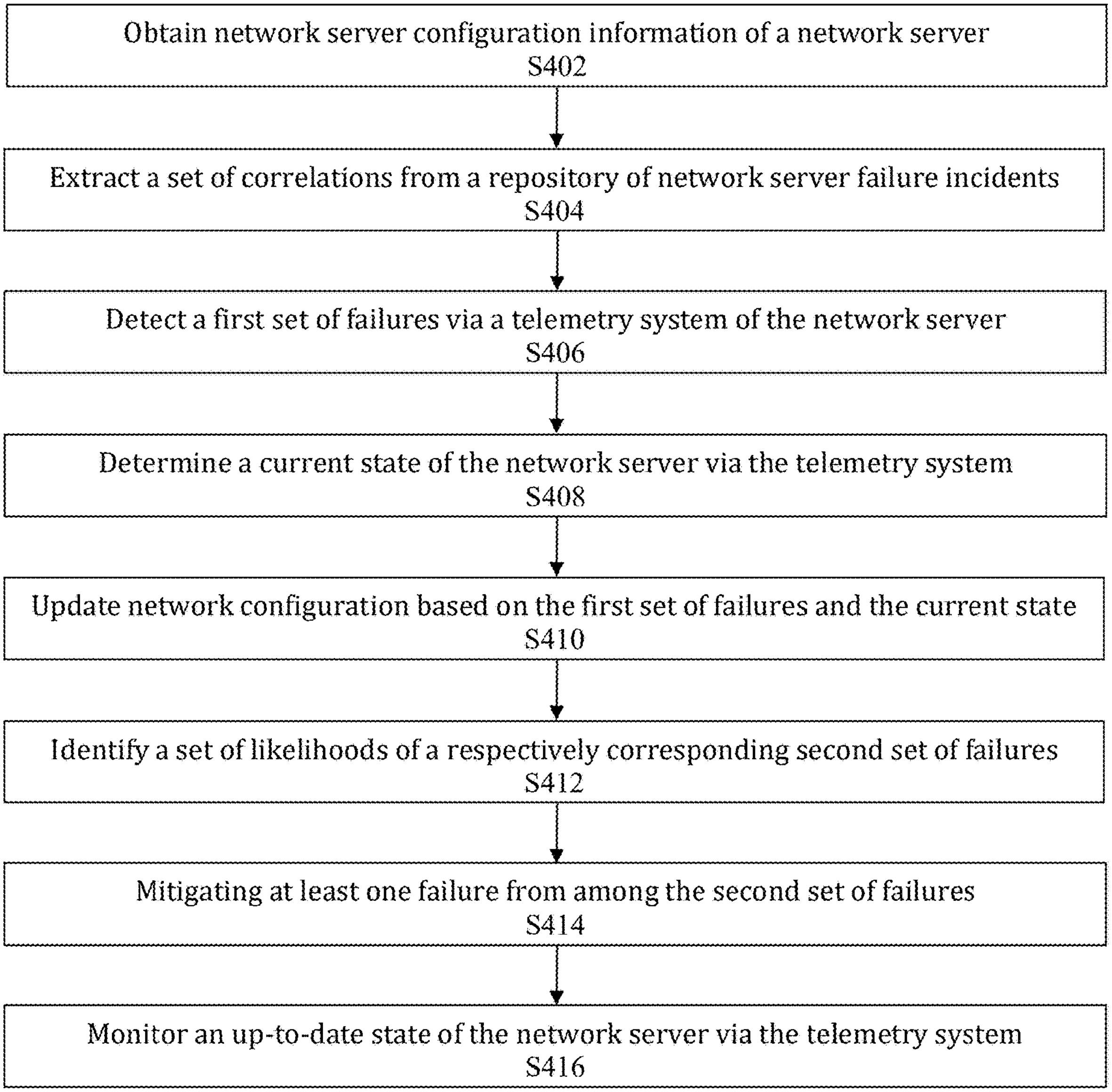
FIG. 4 depicts a flowchart of an exemplary process for improving a network data server infrastructure's resilience to common cause failures.

In process 400 of FIG. 4, at step S402, common cause failure detection system module 302 obtains an initial data server network configuration that includes an initial network infrastructure topology and an initial network component manifest which identifies each component of an infrastructure of the data server network. In a nonlimiting exemplary embodiment of the herein-disclosed invention, the components of the data server network's infrastructure may include various hardware elements, such as hard disks, processors, fans, RAMs, switches, etc.

At step S404, common cause failure detection system module 302 extracts, from at least one repository of historical network failure incident information, a set of correlations that includes at least one correlation between more than one network component failure which respectively correspond to more than one component of the infrastructure.

At step S406, common cause failure detection system module 302 detects, via at least one telemetry system, a first set of failures that respectively correspond to a first set of components of the infrastructure.

At step S408, common cause failure detection system module 302 determines a current state of the data server network via the at least one telemetry system.

At step S410, common cause failure detection system module 302 generates an updated network configuration by updating the initial data server network configuration based on the first set of failures and the current state of the data server network.

At step S412, common cause failure detection system module 302 identifies, by evaluating the set of correlations against the updated network configuration, at least one from among a first set of root causes of the first set of failures and a second set of components that is likely to fail as a result of at least one from among the first set of failures and the first set of root causes of the first set of failures.

At step S414, common cause failure detection system module 302 mitigates the result by at least one from among preventing and repairing at least one subsequent failure of at least one respectively corresponding second component from among the second set of components.

In an embodiment, common cause failure detection system module 302 may prevent the at least one subsequent failure by programmatically repairing the first set of root causes. However, in an additional or alternative embodiment, common cause failure detection system module 302 may also (or alternatively) prevent the at least one subsequent failure by programmatically decoupling the at least one respectively corresponding second component from the first set of root causes. For the purposes of this disclosure, the term "programmatic" refers to any action or operation that is performed by way of computer software programming.

In another embodiment, common cause failure detection system module 302 may repair the at least one subsequent failure by programmatically replacing the at least one respectively corresponding second component with at least one respectively corresponding new component. In a further embodiment, common cause failure detection system module 302's programmatically replacing may include deploying the at least one respectively corresponding new component to replace the at least one respectively corresponding second component.

In embodiments, common cause failure detection system module 302 may deploy such a replacement by electronically instructing, via an interface, an infrastructure component supplier to supply the at least one respectively corresponding second component. For example, in an exemplary embodiment, the infrastructure component supplier may be an infrastructure-as-a-service (IaaS) provider and the at least one respectively corresponding second component's replacement may be entirely programmatic.

At step S416, common cause failure detection system module 302 monitors the data server network via the at least one telemetry system by evaluating a new state of the data server network in order to determine whether the evaluating of the new state identifies a third set of failures of a third set of components of the data server network infrastructure.

After step S416, common cause failure detection system module 302 may identify the above-mentioned third set of failures based on the monitoring of the data server network. In an embodiment, common cause failure detection system module 302 may respond to this identification by determining an updated state of the data server network via the at least one telemetry system.

In an embodiment, process 400 may also comprise at least one from among: providing, by analyzing an anticipated failure, a likelihood of the anticipated failure; and providing a graphical user interface (GUI). In the embodiment, the GUI may display at least one from among: historical failure predictions; historical failure remediations; current statuses of respectively corresponding failures; and a mapping view. Additionally, in the embodiment, the mapping view may include: a mapping for each from among a set of potential remediations; and descriptions of respectively corresponding remediation conditions. In the method, the respectively corresponding remediation conditions may comprise at least one from among: component-specific remediation information (e.g., inventory information); and impact-related failure information.

In a further embodiment, common cause failure detection system module 302 may extract, from the updated state of the data server network, at least one new correlation that exists between the third set of failures and at least a fourth failure that respectively corresponds to at least a second component of the data server network. Then, in an additional embodiment, common cause failure detection system module 302 may replace the set of correlations with an updated set of correlations by incorporating the at least one new correlation into the set of correlations.

Based on the above-mentioned updated network configuration, in yet a further embodiment of the invention, common cause failure detection system module 302 may calculate a set of likelihoods of failure that respectively correspond to the second set of components. In an additional embodiment, common cause failure detection system module 302 may utilize a graphical user interface (GUI) to display the set of likelihoods of failure and a set of respectively corresponding mappings that associates each likelihood from among the set of likelihoods with a respectively corresponding component from among the second set of components. In a further embodiment, common cause failure detection system module 302 may also utilize the GUI to display a depiction of at least one from among an up-to-date network infrastructure topology and an up-to-date network component manifest.

In yet further embodiments, common cause failure detection system module 302 may utilize a set of artificial intelligence and machine learning (AI/ML) models to calculate the set of likelihoods of failure. In an exemplary embodiment, each AI/ML model from among the set of AI/ML models may have been trained in accordance with a distinct methodology that is based on the set of correlations.

In yet even further embodiments, the above-mentioned set of likelihoods of failure may comprise a first subset of likelihoods of failure and a second subset of likelihoods of failure, the set of AI/ML models may comprise a first AI/ML model and a second AI/ML model, the first AI/ML model may have calculated the first subset of likelihoods of failure, the second AI/ML model may have calculated the second subset of likelihoods of failure, and/or the set of likelihoods of failure may comprise respectively corresponding weighted aggregates of at least the first subset of likelihoods of failure and the second subset of likelihoods of failure.

In additional embodiments of the invention, the GUI may include a plurality of views that comprise a first view that depicts the first subset of likelihoods of failure, a second view that depicts the second subset of likelihoods of failure and a third view that depicts the set of likelihoods of failure. In these additional embodiments, the GUI may further include a drop-down menu and may display at least one selected view from among the plurality of views based on at least one selection from a drop-down menu, which includes a respectively corresponding plurality of selections.

An embodiment of the present invention relates to an intelligent automation system that predicts, and remediates, instances of common cause failures within server systems. In common cause failures, a common cause leads more than one system component to fail. Hence, an embodiment of present invention may establish interrelation among a group of components most likely to fail concurrently and may discover a common cause of their respective failures.

Subsequently, an embodiment of the present invention may mitigate the common cause and thereby prevent further components among the group from failing. Accordingly, an embodiment of the present invention customizes its data collection process, its data transformation and postprocessing operations, as well as its machine learning algorithm selection, on the basis of at least one from among the specific common cause failure(s) at hand and the specific server component failures which result from the specific common cause failure(s).

In embodiments of the present invention, redundancy may be built into a physical infrastructure of a set of data centers (and/or may be built into their data's distribution) in order to improve fault tolerance by providing alternative computing infrastructure(s) for any components that fail. However, although this redundant design can prevent large-scale outages, it may not prevent common cause failures (CCFs), which may persist in spite of such redundancy.

It is not uncommon for multiple hardware components to fail within close spatial and/or temporal proximity of one another due an underlying relationship between their failures. An embodiment of the present invention utilizes these underlying relationships, which be further impacted by differences in dynamic changes in the set of data centers' physical infrastructure. Moreover, different data center models have different configurations which can make it challenging to map data center hardware component relationships.

In CCFs, a common root cause can lead a number of hardware components to fail. Therefore, the present invention identifies relationships between a group of components likely to fail due to a common root cause and mitigates effects of the common root cause by preventing and/or repairing such a CCF.

The technology implemented by the invention disclosed herein may be referred to as a measurement, analysis and reporting system for common cause failures (MARS-CCF), which is a detection system that may continuously stream data from fleets of multi-region and multi-site servers. In an embodiment, MARS-CCF may predict the occurrence of the failure of several server hardware components concurrently and, in response, MARS-CCF may mitigate the issues that such a prediction raises.

In an embodiment, MARS-CCF may include obtain data, develop and deploy machine learning models, and process data. MARS-CCF may obtain data through data sourcing and by streaming live data (e.g., performance data), which may be obtained continuously and in real-time from multi-region and multi-site servers via telemetry agents. In the embodiment, MARS-CCF may utilize these techniques to develop and deploy machine learning models, and MARS-CCF may utilize the data obtain by these techniques to make inferences for machine learning models and to train, validate, and test the machine learning models. Additionally, MARS-CCF may include a failure detection system that detects a primary failure, and MARS-CCF may detect common cause failures from a pool of failures. In an embodiment, MARS-CCF may perform deployment and data processing in order to obtain a targeted view for display.

In an embodiment, MARS-CCF's detection system may remediate multiple predicted failures that are associated with one another. In an exemplary embodiment, when several hardware components' respective failures are predicted to occur imminently due to a common cause, MARS-CCF may respond by scheduling and implementing necessary repairs (which may include replacements) of the associated hardware components. This proactive server maintenance addresses imminent failures of server hardware components before they actually transpire. Accordingly, MARS-CCF may identify and address hardware component common cause failures that impact downstream applications in real-time (e.g., less than one second). These hardware component common cause failures can span different types of hardware components that fail with close temporal proximity of one another due to a common root cause.

In an embodiment, MARS-CCF may calculate probabilities that a group of respective hardware components will fail as a result of a common root cause, and MARS-CCF may identify the common root cause for each probability that is calculated. In an exemplary embodiment, MARS-CCF may determine that a plurality of storage devices share a common switch and, by MARS-CCF, each storage device from among this plurality of storage devices may be associated with a corresponding group on the basis of their common switch. In the embodiment, MARS-CCF may ingest this data and associate hardware components that have common vulnerabilities with one another. Accordingly, MARS-CCF may optimize a system's state and/or performance by tracing common cause failures to their source(s) and isolating hardware components that have a potential to be fatally impacted by these source(s) and/or resulting failure(s).

MARS-CCF may utilize a graphical interface to display predictive analytics when it calculates CCF probabilities. MARS-CCF's user interface may display calculations by one or more machine learning models and an expected time-to-failure (TTF) duration for each CCF probability that exceeds a threshold. MARS-CCF may additionally or alternatively utilize a majority voting mechanism across its machine learning models to determine which hardware components are most likely to fail due to a CCF, and this information may be identified and/or flagged via the graphical interface. MARS-CCF may give highest priority to this cluster and prevent and/or rectify the cluster's CCFs in order to prevent any of them from raising further issues. In an embodiment, MARS-CCF may provide explainability information via an interpretability report that acts as a log of rationales utilized to make machine learning decisions. MARS-CCF's explainability information may convey insights on factors driving each machine learning model's calculated probabilities. Accordingly, in the embodiment MARS-CCF may utilize its explainability information to reduce or eliminates a weakness, bias, or other deficiency of its machine learning models.

In an embodiment, MARS-CCF may detect critical common hardware component failures and may determine which of the critical common hardware component failures have transpired. In the embodiment, MARS-CCF may respond to this detection and or determination by performing remediation actions such as replacing at least one critical common hardware component and classifying any associated hardware components as being susceptible to at least one common cause failure.

MARS-CCF may deem predicted hardware component failures as either reparable (i.e., not requiring a replacement) or non-reparable (i.e., requiring a replacement). MARS-CCF may monitor new hardware component (e.g., Disk, DIMM, etc.) availability levels at each data center location and may deploy required hardware components in order to replace required hardware components and build up reserves of unrequired hardware components for any replacements that may be required in the future. Based on the specific hardware components that are required and their availability (e.g., based on the reserves), MARS-CCF may determine which hardware component replacements can currently be addressed, and MARS-CCF may also determine an availability timeframe for unavailable hardware components. Accordingly, the invention described herein enables CCFs to be addressed proactively, which reduces downtime within a server.

By utilizing technologies such as machine learning, and applying them to common cause failure taxonomies, MARS-CCF makes hardware maintenance decision-making nimbler and enables MARS-CCF to make evidence-based decision-making. MARS-CCF's predictive analytics solutions (such as its probability calculations) may comprise an aggregated platform that is capable of displaying one or more detailed figures and/or views for insight on a machine learning model's decision-making rationale(s). In an embodiment, MARS-CCF may improve the machine learning model by utilizing its decision-making rationale(s) to reduce or eliminate its deficiencies (e.g., machine learning model biases, unknown information, hallucinations, etc.).

MARS-CCF may provide one or more views of a mapping of server hardware components and their relationships to one another (e.g., susceptibility to CCFs). In an embodiment, MARS-CCF may quantify (e.g., as a percentage or other numerical value) each server hardware component's relationship to one another. In an embodiment, MARS-CCF may utilize these relationships (e.g., quantifications) to calculate one or more probabilities of CCFs. Since the impact of CCF increases with the number of highly coupled components that lie within a group, MARS-CCF may generate notifications of risks associated with identified groups of highly correlated components that have mutual relationships that exceed a predetermined threshold, irrespective of whether a root cause of the CCFs no longer exists.

In an embodiment, MARS-CCF may provide a plurality of views and may compare and contrast the CCF probability calculations that pertain to imminent CCFs, against historic trends and figures. In an exemplary embodiment, a cumulative analysis view of MARS-CCF may provide trend data of an aggregate of distinct machine learning model CCF predictions for each type of hardware component, and a component insight view of MARS-CCF may indicate each hardware component's percentage of contribution to any identified CCFs. MARS-CCF may also indicate a location of each hardware component.

Accordingly, MARS-CCF's views may provide insights into whether data across a slice (which may be a regional location) has a historically high number of CCFs. Therefore, MARS-CCF brings backed-analytics on historic hardware component failures and plays a key role in retrospective decisions to select server models to be deployed on the basis of comparing and contrasting hardware component consistencies and reliability metrics. The MARS-CCF invention disclosed herein is capable of monitoring of servers across global data centers in a multi-server model setting.

CCF classifications describe failures in which multiple hardware components can fail due to a common root cause. CCFs may be large in scale and/or have costly impacts, thus there are significant incentives to classify, predict, and prevent their occurrence. CCFs may occur when multiple hardware component failures have the same principal underlying trigger. CCFs may be identified by the onset of a shared root trigger event, which may cause multiple hardware components to fail in a close temporal proximity of one another. CCFs typically arise in circumstances where multiple hardware components connected via a common *nexus*.

For example, in a storage area network (SAN), a single switch may control storage traffic between multiple servers and a centralized shared storage system. In such embodiments, failures in the centralized shared storage system can have the potential to force all (or regions) of the SAN to go offline. As a result, the SAN's services may experience bottlenecks due congestion in its network links, and the SAN's storage devices may have slower response times than usual. This increased latency and reduced throughput may prevent servers from reading and writing data to the affected storage devices, which would cause data to become inaccessible or corrupted and may lead one or more servers to crash across more than one or more regions of an infrastructure affected by the SAN's performance.

As another example, hardware load balancers serve as a common point of failure for the multiple servers connected to them. Accordingly, when hardware load balancers fails, incoming requests may not be routed properly and/or evenly distributed to the servers connected to them, either of which could lead to service disruptions, diminished performance, and/or failures of one or more components of the affected servers. Moreover, the failover mechanism for redirecting load balancer traffic to healthy servers may become unavailable, which could impact the availability and performance of the entire system.

Every CCF result from one or more of a variety of root causes, such as a "random" failure, a predictable failure, and/or a maliciously induced failure, for example. As explained above, in a CCF, more than one failure may occur within close temporal proximity of one another due to a common underlying problem or root cause. It is typical for a common connection point to serve as a single point of failure that leads multiple hardware components that rely on the connection point to be impacted its failure. Therefore, the hardware components that are susceptible to CCFs, usually depend on a common critical shared resource as a connection point.

CCFs may have significant effects, such as widespread data loss, downtime, and physical damage to one or more hardware components. A major concern with CCFs is that redundancy-based system protections do not protect against CCFs, and this characteristic makes CCFs particularly destructive. Therefore, to mitigate risks posed by CCFS, backup systems may be added to global data centers as fail-safes to supplement any redundancy-based protections of the global data centers. For even further protection, such global data centers may additionally utilize MARS-CCF to predict whether any of their hardware components (e.g., components with a common connection, design, and/or configuration) are likely to experience a CCF. MARS-CCF may then monitor each such critical hardware component of the global data centers in order to determine whether it should be replaced and/or re-stocked. Hence, by addressing CCFs sooner and even prior to their occurrence, MARS-CCF improves an infrastructure of one or more servers by eliminating and/or reducing an amount of time required for the one or more servers to recover from crashes and other service disruptions.

In an embodiment, MARS-CCF may provide and associate each hardware component with a relative confidence score of common cause failure occurring in the near-term for each machine learning model, where the score is relative to each machine learning model deployed. Accordingly, MARS-CCF may prioritize the hardware components that have a higher probability of occurrence of common cause failure, triggering the downstream actions earlier for such hardware components. By utilizing its analysis of historic hardware component failure figures over time and by accounting for any seasonality of its incident figures, MARS-CCF may forecast risks of near-term hardware failures then compare such risks to a threshold and determine which hardware components require immediate investigation or remediation.

In embodiments, MARS-CCF may obtain various types of data. Such types of data may include server data such as its server manufacturer, data center region, country code, location, product class, date of manufacture, etc. This information rarely changes and is typically obtained during a server's installation. Additionally, this information helps provide MARS-CCF with a core information blueprint of every applicable server and their relationships with each other. Data such as make, model, configuration, capacity (e.g., RAM size of the SSD), etc. may also be obtained to provide baseline information about hardware components. In an embodiment, MARS-CCF may utilize this data as feature attributes (that describe characteristics and properties of corresponding components) for one or more of its machine learning models because such information can be crucial to identifying CCF.

MARS-CCF may also obtain live data readings from telemetry agents. In an embodiment, a REST API Connector may be utilized to periodically fetch data from multiple industry standard RESTful interface protocol endpoints for each server, respectively. In the embodiment, published data may go to a repository via a distributed messaging system, and a suite of specifications may be utilized to deliver a protocol that provides a RESTful interface for server management, storage, networking, and converged infrastructure. MARS-CCF may utilize a standardized API to ensure consistency and interoperability across distinct hardware vendors and components.

In an embodiment, MARS-CCF may also retrieve temporal state readings, such as temperature, power consumption, fan speed, etc., and MARS-CCF may utilize such temporal state readings to protect its data sources and to ensure that any data that MARS-CCF obtains conforms to a feature set requirement, which may change and/or evolve over time. When hardware components and/or their temporal state readings are upgraded, MARS-CCF may utilize this new data to create new features and to identify their potential predictive value.

In an embodiment, MARS-CCF may also obtain or have access to a history of hardware component failures that is compiled from every applicable server. This history may include a date and time for each failure incident request, a location and amount of hardware components that failed or were affected by a failure in the past, an up-to-date description of a progress of each incident's resolution, and an projected resolution date and time. In such embodiments, MARS-CCF may utilize a set of rules and definitions to evaluate this obtained data to identify CCFs for further processing.

In an embodiment, MARS-CCF may obtain information pertaining to a mapping of links and dependencies between hardware components. In the embodiment, the associations between a reduced functional capacity of a common shared hardware component and its impact to a performance of other linked hardware components, and vice versa, may be obtained by MARS-CCF. By mapping the data both ways, when a common shared hardware component or a linked hardware component's performance declines, MARS-CCF may perform a health check on its linked hardware components.

In an embodiment, MARS-CCF may analyze and process failure data to draw relations between various hardware failures that occur over a predetermined amount of time and, once MARS-CCF has concrete dependencies for hardware component failures, MARS-CCF may obtain temporal state readings and live data readings from each database at times of failure.

In an embodiment, each database table may have a customized procedure according to which obtained data is cleaned and transformed into a standard format by MARS-CCF. Then such data may be merged in a manner where each row of data represents a snapshot of the state of all of a server's hardware components at a given point in time. MARS-CCF may then map this data with processed failure data to generate a labelled training dataset for MARS-CCF's failure prediction machine learning models. In an embodiment, inference data may be prepared in a similar manner, with the exception of its labels.

In an embodiment, MARS-CCF may utilize machine learning models to perform predictive analytics. In the embodiment, MARS-CCF may utilize at least one learning machine learning model to ingest labelled feature matrices and train its input and output, while MARS-CCF also utilizes at least one machine learning model to ingest unlabeled feature matrices.

In an embodiment, a CCF engine may obtain continuous feeds from at least one data sourcing and streaming pipeline from fleets of multi-regional and multi-site servers. A CCF engine may identify feature attributes that are statistically significant to detecting CCFs, and a CCF engine may be comprised of algorithms that are based on defined parameters and comprised of models that are periodically trained to predict CCF probabilities that pertain to server hardware components. In the embodiment, while the ML model development and deployment module operates to detect and/or predict probabilities of server hardware component failures, the common cause failure engine may be executed on top of the ML model development and deployment module in order to predict a further probability of at least one common cause failure from among the detected and/or predicted probabilities of server hardware component failures.

In embodiments, each machine learning model may receive cleaned production data and may continuously generate predictions about a hardware component's health and whether failures are expected. In an embodiment, such predictions may be weighted, and an overall failure probability may be calculated by MARS-CCF. In the embodiment, MARS-CCF may utilize a heuristic to determine a failure probability threshold that MARS-CCF may then utilize to determine when to provide notifications of such failures and when to remediate them or prioritize their remediation.

In an embodiment, static hardware server component information may be utilized to map hardware components and to determine which components are physically and/or logically coupled. For example, when MARS-CCF predicts a failure of a hardware component that is highly coupled with other vulnerable hardware components, MARS-CCF may classify the failure as a CCF and initiate remediation efforts. In embodiments, these remediation efforts may include ordering a replacement for a component that has failed (or is predicted to fail) and rerouting data and/or processes away from the problematic hardware component(s) by rerouting them toward healthy hardware components instead. In an additional embodiment, MARS-CCF may also utilize reinforcement learning concepts to improve its remediation action's efficacy over time.

Accordingly, the pipelines and processes integrated within MARS-CCF are unique and provide multiple benefits. For example, MARS-CCF utilizes the unique taxonomy of hardware component failures as a basis of MARS-CCF functions, operations, determinations, evaluations, etc. In such embodiments, this taxonomy may facilitate one or more searches and discoveries of failure (and/or CCF) by navigating large volumes of information to improve MARS-CCF's hardware component failure identification results, which can be critical to the technological improvement described herein. For example, by distinctly categorizing hardware component failures, MARS-CCF's approach may activate, engage, and employe distinct category-based protocols to dynamically customize its downstream responses according to at least one categorization of any failures that trigger(ed) the downstream response(s).

Additionally, MARS-CCF's multi-view of distinct slices of data may enable MARS-CCRF to generate abnormal figures of hardware component failures that may be determined according to different methodologies (e.g., by utilizing different filters) which MARS-CCF may utilize to formulate targeted approaches for each category.

By extending its taxonomy scheme of classification and definition, MARS-CCF may utilize one or more aggregates of server network data that is obtained throughout a server network's lifecycle. In such embodiments, features such as live data readings and event-based events may be utilized to determine and predict each server's current and further health, respectively, because live data readings and event-based events inform MARS-CCF of one or more core baseline features of each server that MARS-CCF monitors.

Finally, CCF detection focuses on server network components that are vulnerably linked to one another, and CCF detection utilizes such vulnerability links as a basis of a root cause analysis and as a basis for determining mitigating factors that have a direct impact on a health of other server network components. In embodiments, based on a variety of its servers' models and by extension its servers' variety of configurations, MARS-CCF may address permutations of server hardware components that are root causes (and/or CCFs) of a new group of vulnerably linked server network components. Accordingly, MARS-CCF may provide comprehensive notifications and identify important characteristics of each component within a server's network infrastructure in order to immediately (and/or proactively) mitigate failures (and/or CCFs).

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method comprising:

obtaining an initial data server network configuration that includes an initial network infrastructure topology and an initial network component manifest which identifies each component of an infrastructure of the data server network;

extracting, from at least one repository of historical network failure incident information, a set of correlations that includes at least one correlation between more than one network component failure which respectively correspond to more than one component of the infrastructure;

detecting, via at least one telemetry system, a first set of failures that respectively correspond to a first set of components of the infrastructure;

determining, via the at least one telemetry system, a current state of the data server network;

generating an updated network configuration by updating the initial data server network configuration based on the first set of failures and the current state of the data server network;

identifying, by evaluating the set of correlations against the updated network configuration, at least one from among a first set of root causes of the first set of failures and a second set of components that is likely to fail as a result of at least one from among the first set of failures and the first set of root causes of the first set of failures; and mitigating the result by at least one from among preventing and repairing at least one subsequent failure of at least one respectively corresponding second component from among the second set of components.

2. The method of claim 1, further comprising:

monitoring, via the at least one telemetry system, the data server network by evaluating a new state of the data server network to determine whether the evaluating of the new state identifies a third set of failures.

3. The method of claim 2, further comprising:

identifying, based on the monitoring of the data server network, the third set of failures;

determining, via the at least one telemetry system, an updated state of the data server network;

extracting, from the updated state of the data server network, at least one new correlation that exists between the third set of failures and at least a fourth failure that respectively corresponds to at least a second component of the data server network; and replacing the set of correlations with an updated set of correlations by incorporating the at least one new correlation into the set of correlations.

4. The method of claim 1, wherein the preventing of the at least one subsequent failure comprises at least one from among programmatically repairing the first set of root causes and programmatically decoupling the at least one respectively corresponding second component from the first set of root causes, wherein the repairing of the at least one subsequent failure comprises programmatically replacing the at least one respectively corresponding second component with at least one respectively corresponding new component by deploying the at least one respectively corresponding new component to replace the at least one respectively corresponding second component.

5. The method of claim 1, further comprising:

calculating, based on the updated network configuration, a set of likelihoods of failure that respectively correspond to the second set of components; and displaying, via a graphical user interface (GUI), the set of likelihoods of failure and a set of respectively corresponding mappings that associates each likelihood from among the set of likelihoods with a respectively corresponding component from among the second set of components, wherein the GUI comprises a depiction of at least one from among an up-to-date network infrastructure topology and an up-to-date network component manifest.

6. The method of claim 5, further comprising utilizing a set of artificial intelligence and machine learning (AI/ML) models to calculate the set of likelihoods of failure, wherein each AI/ML model from among the set of AI/ML models has been trained in accordance with a distinct methodology that is based on the set of correlations.

7. The method of claim 6, wherein the set of likelihoods of failure comprises respectively corresponding weighted aggregates of at least:

a first subset of likelihoods of failure that is calculated by a first AI/ML model from among the set of AI/ML models; and a second subset of likelihoods of failure that is calculated by a second AI/ML model from among the set of AI/ML models.

8. The method of claim 7, wherein the GUI includes a plurality of views that comprise:

a first view that depicts the first subset of likelihoods of failure;

a second view that depicts the second subset of likelihoods of failure; and a third view that depicts the set of likelihoods of failure, wherein the GUI further includes a drop-down menu and displays at least one selected view from among the plurality of views based on at least one selection from the drop-down menu, which includes a respectively corresponding plurality of selections.

9. The method of claim 1, wherein the initial network component manifest identifies at least one processor component, at least one hard disk component, at least one random access memory (RAM) component, at least one switch component, and at least one fan component.

10. The method of claim 1, further comprising:

providing, by analyzing an anticipated failure, a likelihood of the anticipated failure; and providing a graphical user interface (GUI) that displays at least one from among historical failure predictions, historical failure remediations, current statuses of respectively corresponding failures, and a mapping view that includes a mapping for each from among a set of potential remediations and identifies respectively corresponding remediation conditions, wherein the respectively corresponding remediation conditions comprises at least one from among component-specific remediation information and impact-related failure information.

11. A system comprising:

a processor; and memory storing instructions that, when executed by the processor, cause the processor to perform operations comprising:

obtaining an initial data server network configuration that includes an initial network infrastructure topology and an initial network component manifest which identifies each component of an infrastructure of the data server network;

extracting, from at least one repository of historical network failure incident information, a set of correlations that includes at least one correlation between more than one network component failure which respectively correspond to more than one component of the infrastructure;

detecting, via at least one telemetry system, a first set of failures that respectively correspond to a first set of components of the infrastructure;

determining, via the at least one telemetry system, a current state of the data server network;

generating an updated network configuration by updating the initial data server network configuration based on the first set of failures and the current state of the data server network;

identifying, by evaluating the set of correlations against the updated network configuration, at least one from among a first set of root causes of the first set of failures and a second set of components that is likely to fail as a result of at least one from among the first set of failures and the first set of root causes of the first set of failures; and mitigating the result by at least one from among preventing and repairing at least one subsequent failure of at least one respectively corresponding second component from among the second set of components.

12. The system of claim 11, wherein when executed, the instructions cause the processor to perform further operations comprising:

monitoring, via the at least one telemetry system, the data server network by evaluating a new state of the data server network to determine whether the evaluating of the new state identifies a third set of failures.

13. The system of claim 12, wherein when executed, the instructions cause the processor to perform further operations comprising:

identifying, based on the monitoring of the data server network, the third set of failures;

determining, via the at least one telemetry system, an updated state of the data server network;

extracting, from the updated state of the data server network, at least one new correlation that exists between the third set of failures and at least a fourth failure that respectively corresponds to at least a second component of the data server network; and replacing the set of correlations with an updated set of correlations by incorporating the at least one new correlation into the set of correlations.

14. The system of claim 11, wherein when executed, the instructions cause the processor to perform further operations comprising:

calculating, based on the updated network configuration, a set of likelihoods of failure that respectively correspond to the second set of components; and displaying, via a graphical user interface (GUI), the set of likelihoods of failure and a set of respectively corresponding mappings that associates each likelihood from among the set of likelihoods with a respectively corresponding component from among the second set of components, wherein the GUI comprises a depiction of at least one from among an up-to-date network infrastructure topology and an up-to-date network component manifest.

15. The system of claim 14, wherein when executed, the instructions cause the processor to perform further operations comprising:

utilizing a set of artificial intelligence and machine learning (AI/ML) models to calculate the set of likelihoods of failure, wherein each AI/ML model from among the set of AI/ML models has been trained in accordance with a distinct methodology that is based on the set of correlations.

16. The system of claim 15, wherein when the instructions are executed, the set of likelihoods of failure comprises respectively corresponding weighted aggregates of at least:

a first subset of likelihoods of failure that is calculated by a first AI/ML model from among the set of AI/ML models; and a second subset of likelihoods of failure that is calculated by a second AI/ML model from among the set of AI/ML models.

17. The system of claim 16, wherein when the instructions are executed, the GUI includes a plurality of views that comprise:

a first view that depicts the first subset of likelihoods of failure;

a second view that depicts the second subset of likelihoods of failure; and a third view that depicts the set of likelihoods of failure, wherein the GUI further includes a drop-down menu and displays at least one selected view from among the plurality of views based on at least one selection from the drop-down menu which includes a respectively corresponding plurality of selections.

18. A non-transitory computer-readable medium that stores instructions that, when executed by a processor, cause the processor to perform operations comprising:

obtaining an initial data server network configuration that includes an initial network infrastructure topology and an initial network component manifest which identifies each component of an infrastructure of the data server network;

extracting, from at least one repository of historical network failure incident information, a set of correlations that includes at least one correlation between more than one network component failure which respectively correspond to more than one component of the infrastructure;

detecting, via at least one telemetry system, a first set of failures that respectively correspond to a first set of components of the infrastructure;

determining, via the at least one telemetry system, a current state of the data server network;

generating an updated network configuration by updating the initial data server network configuration based on the first set of failures and the current state of the data server network;

identifying, by evaluating the set of correlations against the updated network configuration, at least one from among a first set of root causes of the first set of failures and a second set of components that is likely to fail as a result of at least one from among the first set of failures and the first set of root causes of the first set of failures; and mitigating the result by at least one from among preventing and repairing at least one subsequent failure of at least one respectively corresponding second component from among the second set of components.

19. The computer-readable medium of claim 18, wherein when the instructions are executed, the preventing of the at least one subsequent failure comprises at least one from among programmatically repairing the first set of root causes and programmatically decoupling the at least one respectively corresponding second component from the first set of root causes, the repairing of the at least one subsequent failure comprises programmatically replacing the at least one respectively corresponding second component with at least one respectively corresponding new component by deploying the at least one respectively corresponding new component to replace the at least one respectively corresponding second component.

20. The computer-readable medium of claim 18, wherein when executed, the instructions cause the processor to perform further operations comprising:

providing, by analyzing an anticipated failure, a likelihood of the anticipated failure; and providing a graphical user interface (GUI) that displays at least one from among historical failure predictions, historical failure remediations, current statuses of respectively corresponding failures, and a mapping view that includes a mapping for each from among a set of potential remediations and identifies respectively corresponding remediation conditions, wherein the respectively corresponding remediation conditions comprises at least one from among component-specific remediation information and impact-related failure information.

* * * * *